United States Patent [19]

Gelvezon et al.

[11] 4,368,869
[45] Jan. 18, 1983

[54] LEVELER FOR DISHWASHER AND THE LIKE

[75] Inventors: Aaron E. Gelvezon, Fullerton; Alphonso Merino, South Gate, both of Calif.

[73] Assignee: Norris Industries, Inc., Los Angeles, Calif.

[21] Appl. No.: 187,416

[22] Filed: Sep. 15, 1980

[51] Int. Cl.$^3$ .................. F16M 7/00; F16M 11/24
[52] U.S. Cl. .................. 248/656; 248/669; 248/188.2; 248/188.4; 312/253; 52/126.1
[58] Field of Search .............. 248/188.4, 188.8, 650, 248/656, 677, 669, 346.1; 52/122; 312/250, 253

[56] References Cited

U.S. PATENT DOCUMENTS

| | | | |
|---|---|---|---|
| 1,355,429 | 10/1920 | Sabins et al. | 248/188.4 |
| 1,994,601 | 3/1935 | Wellman et al. | 248/650 |
| 2,101,852 | 12/1937 | Hammer | 248/188.4 |
| 2,763,342 | 9/1956 | French | 52/122 |
| 2,793,467 | 5/1957 | Matter . | |
| 2,803,510 | 8/1957 | Carbary | 312/253 |
| 2,932,122 | 4/1960 | Matter . | |
| 3,071,887 | 1/1963 | Von Arb | 248/188.4 |
| 3,186,670 | 6/1965 | Perl | 248/188.2 |
| 3,424,413 | 1/1969 | Applegate | 248/188.4 |
| 3,464,670 | 9/1969 | Rasmussen | 52/122 |
| 3,491,977 | 1/1970 | Iller | 312/253 |
| 3,568,971 | 3/1971 | Jarmy | 248/188.4 |
| 3,750,989 | 8/1973 | Bergeson | 248/650 |
| 3,814,363 | 6/1974 | Brelosky | 248/188.4 |
| 3,885,361 | 5/1975 | DeSchutter | 52/122 |
| 3,927,853 | 12/1975 | Guth | 248/188.2 |

FOREIGN PATENT DOCUMENTS

| | | | |
|---|---|---|---|
| 2416154 | 10/1975 | Fed. Rep. of Germany | 248/188.4 |
| 430980 | 8/1967 | Switzerland | 248/656 |

*Primary Examiner*—Victor N. Sakran

[57] ABSTRACT

An apparatus for leveling and adjusting the height of household appliances. A nut or similar device is mounted on the appliance frame for receiving an upright weight supporting bolt. The bolt rests on a flat arm, which in turn rests on the floor or supporting surface. One end of the arm is attached to the frame and provides a low friction surface for contact with the bolt; thereby, substantially all lateral forces derived from sliding the appliance across the floor are absorbed by the arm and not transmitted to the bolt.

4 Claims, 4 Drawing Figures

LEVELER FOR DISHWASHER AND THE LIKE

BACKGROUND OF THE INVENTION

1. Field of the Invention

This invention is directed to a load-leveling apparatus for utilization in large household appliances, such as dishwashers, where the appliance is required to be substantially level for proper operation. More specifically, it is directed to a load-leveling apparatus which will allow for horizontal movement of the load without placing significant forces on the vertical adjustment mechanism.

2. Description of the Prior Art

Household appliances, such as dishwashers, refrigerators and clothes washers and dryers, are required to be substantially level during operation. For example, the gearing of the revolving arm of a dishwasher is manufactured to small tolerances allowing for minimal friction between moving parts. A dishwasher in an unlevel position produces undesired forces on the arm; thereby, increasing friction between the arm and its receiving mechanism. Such friction eventually causes heat and increased wear on the parts creating a wobbling movement and probably structural failure or freeze-up. Also, water spillage may occur if the dishwasher tank is not level.

Conventional methods of leveling such appliances utilize a bolt-type arrangement whereby the bolt is mounted vertically on a side or corner of the appliance so that an end of the bolt rests on the floor and is rotated to lift or lower the appliance to the level position. The bolt typically has an increased surface area on the end of the bolt contacting the floor. The disadvantage of such a construction is apparent when the appliance is moved horizontally to another location. The bolt of the conventional device receives a large portion of the appliance's weight. In actuality, if leveling devices are placed at the four corners of the appliance, the weight is distributed only to those four bolts. Therefore, when moved horizontally, the resisting frictional force is distributed to the bolts. Lateral forces of such magnitude can cause stress fractures in the bolt and very high torsional loads at the attachment point, causing them to destruct.

Another disadvantage of conventional methods is that the area of the bolt contacting the floor is small; therefore, the weight per square inch is large. Such weight over a small area can cause damage to a soft floor, such as linoleum, leaving a permanent indentation or depression.

Furthermore, the conventional methods will likely cause damage to the floor when the leveling apparatus is adjusted. The bolt, as it is turned, remains in contact with the floor. This turning motion creates circular scratch marks on the floor.

There is, therefore, a long recognized need for an improved load-leveling apparatus which will not be affected by lateral forces as the load is moved. Accordingly, it is an object of the invention to provide an apparatus whereby lateral forces from horizontal movement of the appliance are dissipated and only minimal lateral forces are transmitted to the vertical support mechanism. Another object is to provide a larger surface area for contact with the floor facilitating ease of horizontal movement.

Another object is to provide an apparatus whereby the load bearing capability is not diminished by increased extension of the bolt.

Another object is to provide an apparatus that may be used as both a leveler and as a height adjustment mechanism.

Another object is to provide a leveling apparatus that may be adjusted after the appliance is positioned in place.

Another object is to provide an apparatus whereby the entire load is supported by the axial strength of the vertical support mechanism.

Another object is to provide an apparatus whereby the portion contacting the floor has generally a horizontal attitude allowing for a more efficient horizontal movement of the dishwasher.

Another object is to provide an apparatus in which no height is added to the appliance when the vertical support means is fully retracted.

Another object is to provide an apparatus whereby the member contacting the floor does not rotate.

Another object is to provide an apparatus whereby adjustments may be made on the apparatus while bearing the full weight of the load.

Another object is to provide an apparatus whereby no horizontal motion is imputed to the load during adjustment of the apparatus.

SUMMARY OF THE INVENTION

A load-leveling apparatus is disclosed that supports the load in the vertical direction while dissipating lateral movement forces without significantly stressing the vertical support means. An adjustable upright bolt threadedly engages the load's frame, directly or by means of a nut or similar device carried on the frame, whereby the height of that portion of the load may be changed. A flat arm is provided with a first end attached to the load frame and with the body of the arm passing between the bottom of the bolt and the floor; whereby, substantially all lateral forces will be dissipated by the arm instead of the bolt. The second end of the arm passes through a slot in the frame insuring alignment of the arm and bolt.

DESCRIPTION OF THE PREFERRED EMBODIMENT

Figure 1:
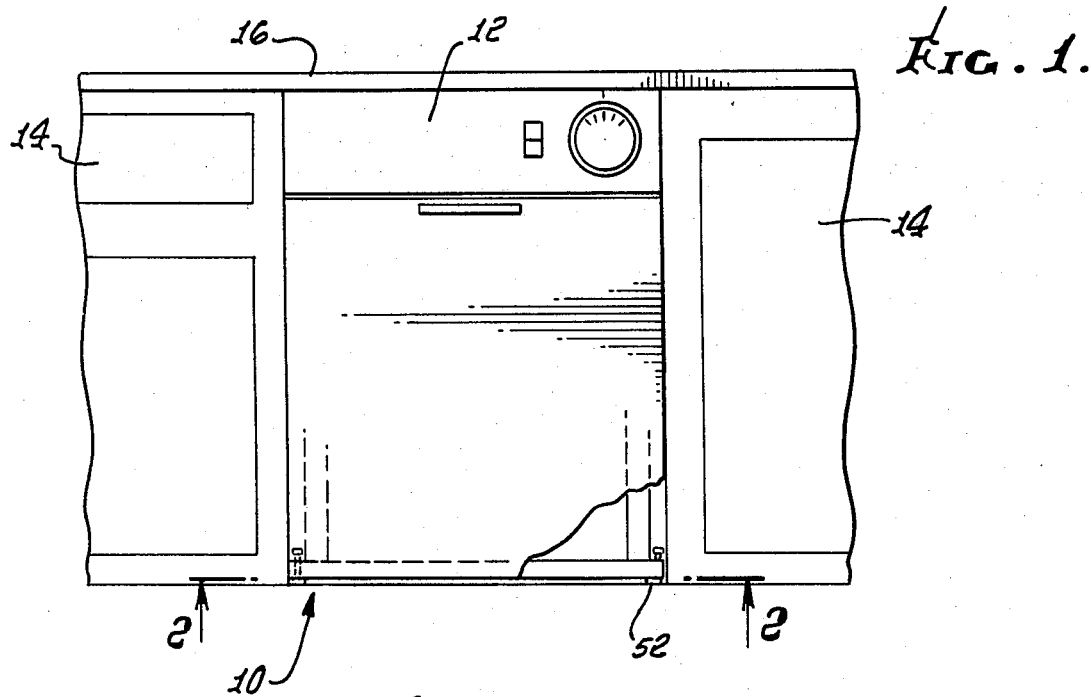
FIG. 1 is a front view, partially in section, of a dishwasher enclosed by cabinets and countertop, incorporating the presently preferred embodiment of the load-leveling device.
Figure 2:
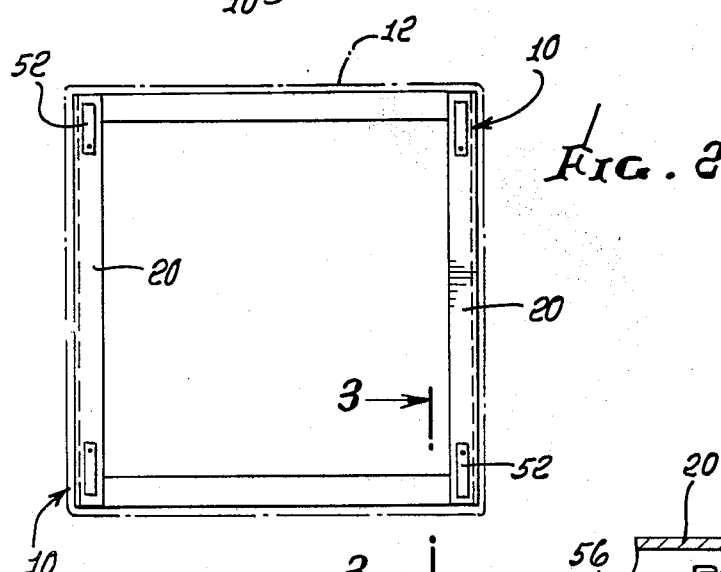
FIG. 2 is a bottom view of the dishwasher taken along line 2—2 of FIG. 1.
Figure 4:
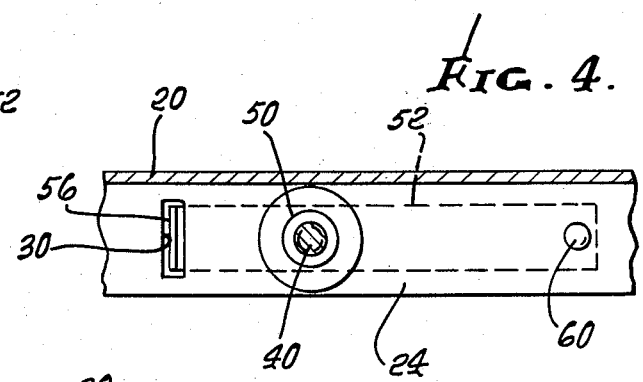
FIG. 4 is a sectional view taken along line 4—4 of FIG. 3.

The load-leveling apparatus of the invention is generally indicated at 10 in FIGS. 1–4. The leveling apparatus 10 is mounted at one or more locations on the downward facing side or bottom of a load, typically a kitchen appliance, such as a dishwasher 12. The dishwasher 12 may be "built-in", fitting between cabinets 14 and below countertop 16. Leveling will best be maintained by placing one of the leveling apparatus 10 at each of the four corners of the dishwasher (FIG. 2).

The apparatus 10 is mounted in the lower frame 20 of the dishwasher 12 which frame is of sufficient strength to support the weight of the dishwasher, as transferred through the apparatus 10. In the preferred embodiment, the apparatus 10 includes a bolt 40, a nut 50, an arm 52 and a rivet 60. The nut 50 and rivet 60 are optional and may be eliminated from the apparatus as discussed below.

The frame 20 (see FIG. 3) that receives the apparatus 10 may be of U-shaped or channel construction for strength. A first flange or rail 22 defines a first opening 26 and a second flange or rail 24 defines a second opening 28. First opening 26 and second opening 28 are aligned vertically and are slightly larger than the diameter of bolt 40. The nut is attached to the second flange 24, the threaded opening of the nut and the opening of the second hole 28 being aligned axially. Alternatively, the first opening 26 may be threaded, thereby eliminating the requirement for nut 50, or a device that functions similar to a nut, such as a Tinnerman fastener clipped onto the frame, may be used.

Figure 3:
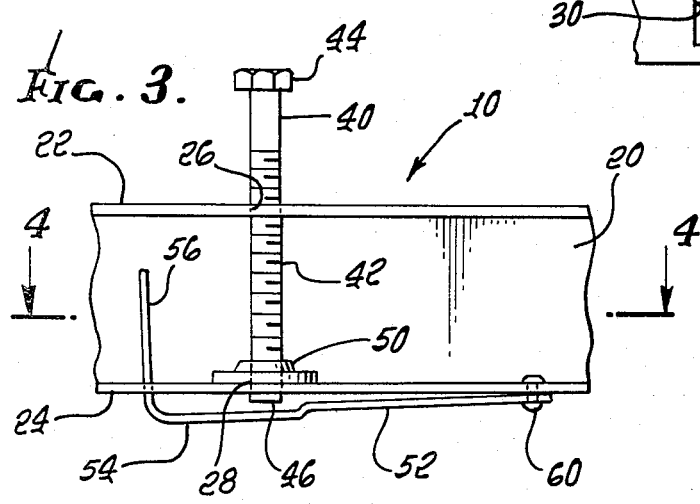
FIG. 3 is an enlarged partial sectional view of the load-leveling device taken along the line 3—3 of FIG. 2.

Arm 52 is permanently attached to the second flange 24. This may be accomplished in several ways, as by screw, bolt and nut, or welding. However, a simple method is by a rivet 60 as shown. The opposite end of arm 52 defines a stabilizer portion 56, which is angularly displaced from the remainder of arm 52 to form an L-shaped member as best seen in FIG. 3. The stabilizer portion 56 is slidably received by a third opening 30 defined by second flange 24. This stabilizer arrangement maintains the arm 52 in proper alignment with bolt 40.

Bolt 40 comprises a bolt head 44, a bolt threaded portion 42 and a bolt end 46. The head 44 comprises the portion of the bolt away from the floor, allowing for adjustment while the appliance is resting on the floor. The bolt end 46 rests on a receiving portion 54 of arm 52. The surface of receiving portion 54 and the bolt end 46 are generally smooth and of low friction qualities. Therefore, as the appliance is moved horizontally, most lateral forces are absorbed through the arm 52 by the rivet 60. Due to the low friction between bolt end 46 and receiving portions 54, there is little force applied laterally to bolt 40.

In operation, the appliance may be leveled by simply rotating one or more of the bolts 40 causing that portion of the appliance to be raised or lowered. Typically, this is carried out for at least the rear corners before the appliance is pushed into place beneath the counter.

Bolt 40 supports the weight of the dishwasher 12, the weight being transferred through the threaded portions of the nut 50 and the bolt 40. The bolt end 46 then transfers the weight to the receiving portion 54 of the arm 52, which in turn rests on the floor. As horizontal movement of the dishwasher occurs, the lateral forces caused by the friction between the floor and arm 52 is absorbed by the rivet 60. Due to the low frictional qualities between the receiving portion 54 of the arm 52 and the bolt end 46, significantly little force is applied to the bolt 40.

What is claimed is:

1. In a leveler for supporting and leveling a dishwasher or the like having an integral frame, the combination of:

a bottom rail fixed in said frame and having a lower surface with first and second openings through said surface;

a generally L-shaped resilient member;

means mounting said member on said rail at said lower surface with one arm of said L parallel to said surface and with the other arm of said L passing upward through said first opening to limit lateral movement of said member; and a bolt mounted in said second opening and threadedly moveable downward to engage said member between said member and said rail and between said mounting means and said first opening, with said frame resting on said member.

2. A leveler as defined in claim 1 wherein said rail includes a channel with a third opening spaced above said second opening with said bolt passing through said third opening.

3. A leveler as defined in claim 1 including two of said bottom rails fixed in spaced parallel relation in said frame, each of said rails having two of said members, mounting means and bolts at opposite ends of the rail, providing independent leveling at each corner of said frame.

4. A leveler as defined in claim 1 including one of said members, mounting means and bolts at each end of said rail, providing independent leveling at each end of said rail.

* * * * *